United States Patent
Sugimoto et al.

(10) Patent No.: US 6,383,649 B2
(45) Date of Patent: May 7, 2002

(54) RESIN-COATED METAL SHEET WITH HIGH REFLECTIVITY AND EXCELLENT ADHESION STRENGTH

(75) Inventors: Yoshiyuki Sugimoto; Takashi Minamigi, both of Hikarishi; Tetsuo Nakamoto, Kumagegun, all of (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 09/725,671

(22) Filed: Nov. 30, 2000

Related U.S. Application Data

(63) Continuation of application No. 08/860,526, filed as application No. PCT/JP95/02639 on Dec. 11, 1995, now Pat. No. 6,235,399.

(30) Foreign Application Priority Data

Dec. 29, 1994 (JP) .............................. 6-338620

(51) Int. Cl.[7] .......................... B32B 5/16; B32B 27/08; B32B 27/32; B32B 27/36
(52) U.S. Cl. ...................... 428/458; 428/324; 428/328; 428/332; 428/461
(58) Field of Search ................................ 428/457, 458, 428/461, 480, 483, 500, 323, 325, 328, 332, 324

(56) References Cited

U.S. PATENT DOCUMENTS

| | | | |
|---|---|---|---|
| 4,113,539 A | 9/1978 | Hotla et al. ................. | 156/306 |
| 4,270,665 A | 6/1981 | Kunimoto et al. .......... | 215/347 |
| 4,330,353 A | 5/1982 | Kunimoto et al. .......... | 156/314 |
| 4,642,959 A | 2/1987 | Sweich et al. ............... | 52/311 |
| 4,743,478 A | 5/1988 | Pusch .......................... | 428/17 |
| 5,026,448 A * | 6/1991 | Reafler et al. .............. | 156/212 |
| 5,030,514 A | 7/1991 | Hartman ..................... | 428/363 |
| 5,079,052 A | 1/1992 | Heyes et al. ................ | 428/35.3 |
| 5,242,751 A | 9/1993 | Hartman ..................... | 428/324 |
| 5,648,126 A | 7/1997 | Kameya et al. ............. | 427/536 |
| 5,670,261 A | 9/1997 | Kameya et al. ............. | 428/457 |

FOREIGN PATENT DOCUMENTS

| | | | |
|---|---|---|---|
| JP | 5967048 | | 4/1984 |
| JP | 3-281245 | * | 12/1991 |
| JP | 6-31881 | * | 2/1994 |

* cited by examiner

*Primary Examiner*—Deborah Jones
*Assistant Examiner*—Michael LaVilla
(74) *Attorney, Agent, or Firm*—Browdy and Neimark

(57) ABSTRACT

A resin-coated metal sheet in which at least one surface is overlaid by a paint layer E, a modified olefin resin layer D of 5 to 100 microns thickness, a pattern or/and solid decorative layer C, an adhesive layer B, and a transparent polyester resin film A of 5 to 10 microns thickness. The modified polyolefin resin layer provided between the transparent polyester resin film and the metal sheet has excellent adhesiveness against the decorative layer, the paint layer and the polyesters resin film so that delamination of the resin-coated metal sheet does not occur even in the case in which the resin-coated metal sheet is formed under severe conditions such as deep drawing. The modified polyolefin layer absorbs any unevenness of the component layers so that the resin-coated metal sheet exhibits excellent reflectivity.

3 Claims, 3 Drawing Sheets

RESIN-COATED METAL SHEET WITH HIGH REFLECTIVITY AND EXCELLENT ADHESION STRENGTH

CROSS-REFERENCE TO RELATED APPLICATIONS

The present application is a continuation of application Ser. No. 08/860,526, filed Nov. 4, 1997, now U.S. Pat. No. 6,235,399 which is a 371 of PCT JP95/02639 filed Dec. 11, 1995, the entire contents of which are hereby incorporated by reference.

FIELD OF THE INVENTION

The present invention relates to a resin-coated metal sheet with high reflectivity and excellent adhesion strength. Even when the resin-coated metal sheet is formed under severe conditions, such as by stretch-forming of the resin-coated metal sheet or by deep-drawing of the resin-coated metal sheet, delamination does not occur.

BACKGROUND OF THE INVENTION

Recently, higher grades of decorative design are desired, together with higher grades of articles such as domestic electrical machinery and apparatus, audio devices, kitchen appliances, and interior finish materials. Higher grade decorative design is expressed by the decorativeness of the surface of the packing materials or other cases of these articles, in particular, in higher reflectivity of the surface. Further, decorative design can be expressed by the shape of the package which is formed by stretch-coating a resin-coated metal sheet or by deep drawing a resin-coated metal sheet. Accordingly, the requirement for a decorative steel sheet with higher vivid reflectivity and having a workable adhesion strength suitable for stretch-forming of the resin-coated metal sheet or by deep-drawing thereof is increasing.

In order to satisfy this requirement, various researches were conducted. For instance, one proposal involves a method of laminating a colored metal sheet with a transparent thermosetting resin film or thermoplastic resin film of 5 to 100 microns and a thermoplastic resin film of 5 to 50 microns thickness having H to 7B hardness, as disclosed in Japanese Patent Publication (Kokai) 55126 of 1991, Heisei 2. However, while this method provides vivid reflectivity, delamination occurs at the interface between two resin components or at the interface between the laminated resin layer and the colored metal sheet. Thus, the workable shape of the decorative metal sheet is limited.

Namely, in the prior art, it was extremely difficult to obtain a laminated metal sheet that has workability fit for stretch-forming of the resin-coated metal sheet or by deep-drawing thereof, which also has vivid reflectivity.

SUMMARY OF THE INVENTION

It is an object of the present invention to provide a resin-coated metal sheet which has a workable adhesion strength fit for stretch-forming of the resin-coated metal sheet of deep-drawing, as well as vivid reflectivity.

A resin-coated metal sheet of the present invention comprises a metal sheet as a base sheet, of which at least one surface is overlaid in sequential order from the metal sheet, a paint layer, a modified polyolefin resin layer of 5 to 100 microns thickness.

Further, a resin-coated metal sheet of the present invention of which at least one surface is overlaid in sequential order, a paint layer, a pattern and/or solid printing layer, a modified polyolefin resin layer of 5 to 100 microns thickness, an adhesive layer, and a transparent polyester resin film of 5 to 100 microns thickness.

Furthermore, a resin-coated metal sheet of the present invention comprises a metal sheet as a base sheet, of which at least one surface is overlaid in sequential order, a paint layer, a modified polyolefin resin layer of 5 to 10 microns thickness, an adhesive layer, and a transparent polyester resin film of 5 to 100 microns thickness.

In these resin-coated metal sheets of the present invention, the paint layer is preferably formed as a top coat layer of the transparent polyester resin film.

Furthermore, in the resin-coated metal sheets of the present invention, the adhesive layer and/or the printing layer desirably include aluminum pigment to mica pigment.

Since the modified polyolefin resin layer which is provided in between the transparent polyester resin film and the metal sheet has excellent adhesiveness to the printing layer, the paint layer and the polyester resin film, even if the resin-coated metal sheet is formed under severe conditions against the resin-coated metal sheet, such as deep drawing, delamination does not occur. Thus, excellent workable adhesion strength is shown. Further, the roughness of the surface of the metal sheet, and unevenness of several component (resin) layers are smoothed out by the modified polyolefin resin layer so that a resin-coated metal sheet having excellent vivid reflectivity can be produced.

Additionally, since the paint layer is formed as the top coated layer (what is called the "top coat") of the transparent polyester resin film, the scratch resistance of the resin-coated metal sheet which is required when the resin-coated metal sheet is formed or handled is improved.

DETAILED DESCRIPTION OF THE INVENTION

Embodiments of the present invention are explained in detail below.

Figure 1:
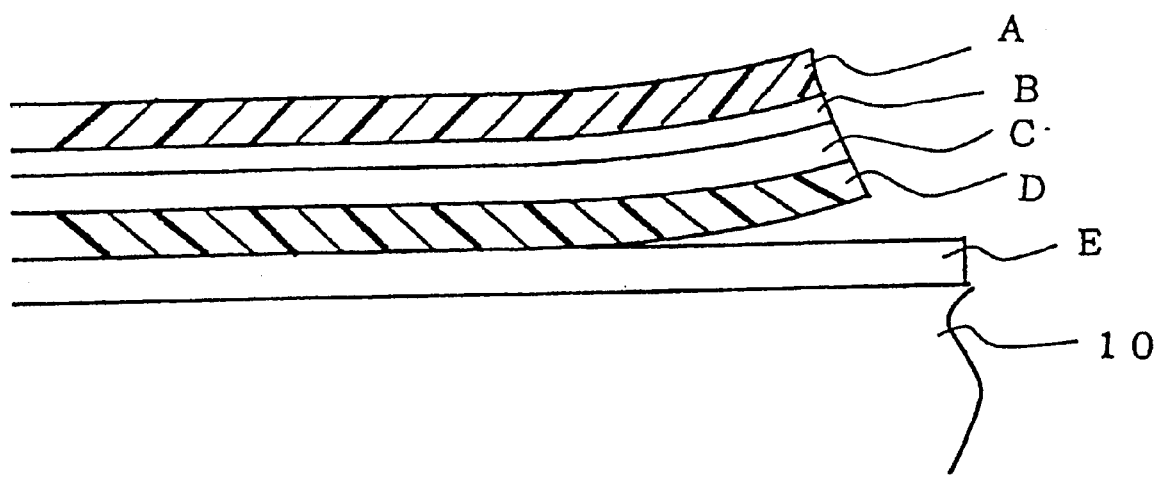
FIGS. 1 to 3 are sectional views showing the structure of one side of a resin-coated metal sheet according to the present invention.
Figure 2:
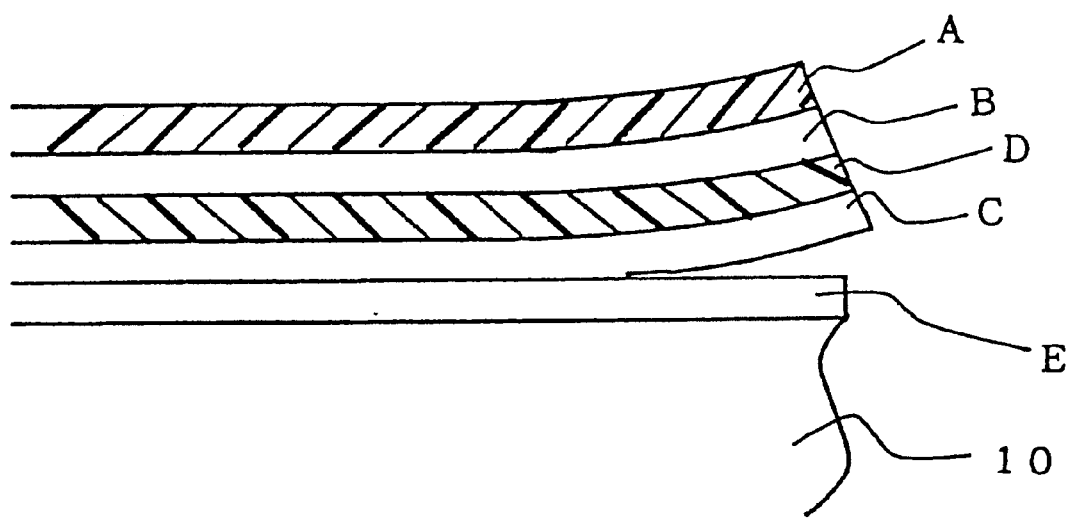
Figure 3:
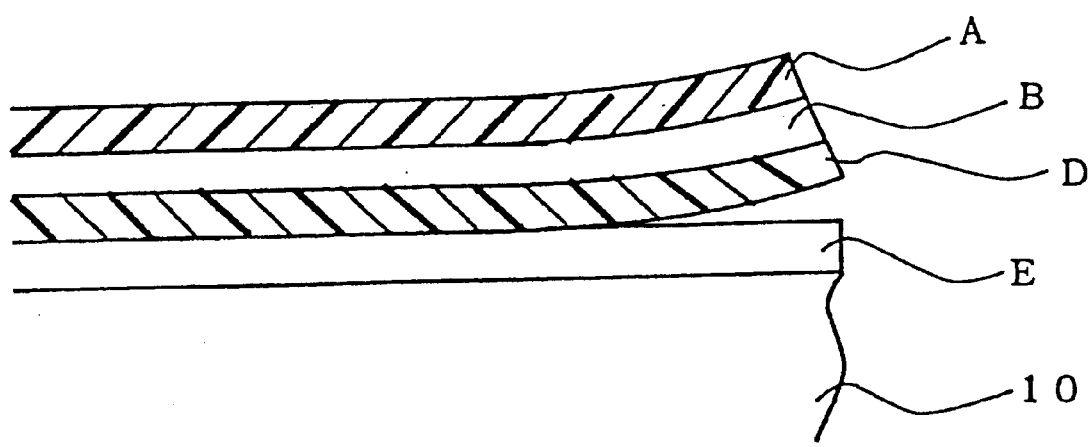

FIGS. 1 to 3 show the structures of one side of resin-coated metal sheets having resin coating layers formed on a metal sheet, respectively. In the present invention, resin coating layers may be provided on both sides of a metal sheet or on only one side of a metal sheet.

The first embodiment of the present invention is explained in which resin coating layers are provided on one side of a metal sheet.

In FIG. 1, "A" denotes a transparent polyester resin film, "B" denotes an adhesive layer, "C" denotes a pattern and/or solid printing layer, "D" denotes a modified olefin resin layer, "E" denotes a paint layer, and "10" denotes the metal sheet.

In the embodiment of the present invention shown in FIG. 1, the transparent polyester resin film A is 5 to 100 microns thick, and forms the outside layer of the resin-coated metal sheet. The thickness of transparent polyester resin film A is preferably 15 to 80 microns. When the thickness of transparent polyester resin film A is less than 5 microns, the vivid reflectivity of the whole of the resin-coated metal sheet is inferior, and handling of transparent polyolefin resin film A in laminating is difficult. When the thickness of the transparent polyester resin film A is more than 100 microns, the workable adhesion strength of the resin-coated metal sheet is inferior.

In order to improve scratch resistance of the resin-coated metal sheet during forming or handling, transparent polyester resin film A is preferably coated with a top coat of thermosetting paint or ultraviolet irradiated resin paint such as silicone resin paint, fluoride resin paint, acrylic resin paint, melamine resin paint, or urethane resin paint of 0.2 to 50 microns in thickness, wherein the thickness of the top coat is preferably 0.5 microns to 30 microns. When the thickness of the top coat is less than 0.2 microns, the interference color is noticeable, and cut resistance is inferior. On the other hand, then the thickness of the top coat is more than 50 microns, the workability thereof decreases, and the cost efficiency is inferior.

Transparent polyester resin film A can be polyethylene terephthalate resin (PET) and copolymers thereof. PET is thermoplastic.

Adhesive layer B contains a resin such as a polyester resin, an epoxy resin, an acrylic resin, a melamine resin, or a urethane resin. In addition to these resins, an adhesive assistant having an adhesive effect, such as glycidoxypropyl trimethoxysilane (a silane coupling agent made by Nipon Unicar, Ltd.) can be used as an ingredient of the adhesive layer in addition to the polymers mentioned above.

Adhesive layer B is preferably 0.1 micron to 50 microns thick, and more preferably 0.5 to 30 microns thick. When the thickness of adhesive layer B is less than 0.1 micron, the boiling water resistance and the workable adhesion strength of the resin-coated metal sheet are inferior. On the other hand, when the thickness of the adhesive layer is more than 50 microns, the external appearance of the resin-coated metal sheet is disfigured by residual solvent associated with the adhesive then the laminate film is heated for laminating. Thereby, the vivid reflectivity of the resin-coated metal sheet becomes inferior.

Adhesive layer B optionally contains a pigment, such as aluminum powder of mica powder. In this case, the ratio of aluminum pigment to solid matter in the adhesive is preferably 0.1% by weight to 30% by weight, more desirable 1% by weight to 20% by weight, because when the ratio of aluminum pigment to solid matter in the adhesive is less than 0.1% by weight, no metallic luster is produced. When the ratio of aluminum pigment to solid matter in the adhesive is more than 30% by weight, the adhesive layer becomes fragile and the vivid reflectivity of the resin-coated metal sheet becomes inferior.

The particles of aluminum pigment have either a globe-like shape or al scalelike shape. The average particle size thereof is preferably 0.1 micron to 100 microns, more desirably 1 micron to 80 microns, in either globelike particles or scalelike particles. When the average particle size is less than 0.1 micron, the resin-coated metal sheet is less decorative. When the average particle size is more than 100 microns, the vivid reflectivity of the resin-coated metal sheet is inferior.

The ratio of mica pigment to solid matter in the adhesive is preferably about 0.1% by weight to 30% by weight, more desirably 1% by weight to 20% by weight. When the ratio of mica pigment to solid matter in the adhesive is less than 0.1% by weight, there is no metallic luster. When the ratio of mica pigment to solid matter in the adhesive is more than 30% by weight, the adhesive layer becomes fragile.

The particles of mica pigment have either a globelike shape or a scalelike shape. The average particle size thereof is preferably 0.1 micron to 100 microns, more preferably 1 micron to 80 microns, in either globelike or scalelike particles When the average particle size is less than 0.1 micron, the decorativeness of the resin-coated metal sheet is worsened. When the average particle size is more than 100 microns, the vivid reflectivity of the resin-coated metal sheet is worsened.

Pattern and/or solid printing layer C comprises a pattern printing layer and/or a solid printing layer for imparting decorativeness to a resin-coated metal sheet. The resins used for the pattern and/or solid printing layer C include polyester resins, epoxy resins, acrylic resins, melamine resins, or urethane resins. Polyester resins are particularly preferable, since, when a polyester resin is used, the workable adhesion strength of the resin-coated metal sheet is higher.

When the printing layer is a pattern printing layer, the thickness of the printing layer is preferably 1 micron to 5 microns. When the thickness of the printing layer is less than 1 micron, a printing pattern does not come out well. When the thickness of the printing layer is more that 5 microns, solvent from the printing ink remains in printing layer C, generating variations in the vivid reflectivity of the resin-coated metal sheet.

When the printing layer C is a solid printing layer, the thickness of the decorative layer is preferably 1 micron to 5 microns. When the thickness of the decorative layer is less than 1 micron, variations in coloring tone of the decorative layer are generate. When the thickness of the decorative layer is more than 5 microns, variations in the vivid reflectivity of the resin-coated metal sheet are generated, and the composite is more expensive to produce.

The decorative layer optionally contains aluminum pigment or mica pigment, in which the ratio of pigment to solid matter in the printing ink is preferably 0.1% by weight to 30% by weight, more desirable, 1% by weight to 20% by weight, in the same manner as the above-mentioned ratio of pigment to solid matter in the adhesive layer.

Modified polyolefin resin layer D is 5 microns to 100 microns thick, which is essential for the present invention or provide the excellent workable adhesion strength and high vivid reflectivity to the resin-coated metal sheet.

The modified polyolefin resin is produced by blending propylene copolymer having a carboxyl group within a molecule with polypropylene in the following ratio:

propylene copolymer 100 parts by weight to 20 parts by weight;

polypropylene, 80 parts by weight to 0 parts by weight.

The thickness of the modified polyolefin resin layer D is preferably 10 microns to 80 microns, more preferably 20 microns to 70 microns. When the thickness of the modified polyolefin resin D is less than 5 microns, the vivid reflectivity of the entire resin-coated metal sheet is reduced. When the thickness of the modified polyolefin resin layer D is more than 100 microns, the surface hardness and the workable adhesion strength of the entirety of the resin-coated metal sheet are lowered.

The modified polyolefin resin includes polyolefin polymers having at least one functional group selected from the group consisting of hydroxyl groups, hydrolyzable groups, carboxyl groups, and acid anhydride groups within the molecule, or a mixture of the polyolefin polymer with another polyolefin polymer. One or more types of pigment can be mixed in with the modified polyolefin resin layer.

Further, it is preferable to apply an anchor coat to an upper side or a bottom side or to both sides of the modified polyolefin resin layer using a silane coupling agent or other anchor coat to improve the adhesive strength between the resin layers.

The composite of transparent polyester resin film A, adhesive layer B, printing layer C, and modified polyolefin resin layer D is called a laminate film.

Paint layer E shown in FIG. 1 is provided to form a colored layer which is directly formed on a metal sheet as a design. The paint may be a resin such as a polyester resin, an acrylic resin, a urethane resin, an epoxy rein, or a melamine resin as the primary ingredient. It is preferable that polyester resin is used as the primary paint ingredient, because the workable adhesion strength of polyester resins is extremely good. The thickness of the paint layer is preferably 1 micron to 30 microns, more preferably 5 microns to 30 microns.

Paint layer E may comprise a paint layer formed of two or more layers. Namely the paint layer E may include a laminate formed of plural layers having an under coating including a rust preventing pigment. For instance, a first layer as an under coating layer may be formed of colored paint, and a second layer laid on top of the under coating layer may be formed of clear paint.

The metal sheet 10 as a base sheet shown in FIG. 1 can be a steel sheet, a stainless steel sheet, or a surface treated steel sheet, such as galvanized sheet iron, composite galvanized sheet iron, nickel-plated steel sheet, or tin-free steel. Furthermore, the metal sheet 10 may include nonferrous metal sheets such as aluminum sheets and copper sheets. The thickness of the metal sheet 10 is preferably 0.2 mm to 1.2 mm.

When one side of the metal sheet 10 is coated with resin, the bottom layer of the metal sheet 10 (that is, the side of the metal sheet 10 which is not coated with resin) is preferably coated with rust proofing paint of 0.1 micron to 50 microns thickness. The bottom layer is further preferably coated with polyvinyl chloric for rust proofing. Paint resin used can include as a principal component resins such as polyester resins, acrylic resins, polyurethane resins, epoxy resins, or melamine resins.

FIG. 2 corresponds to an embodiment of the invention wherein "A" is a transparent polyester resin film, "B" is an adhesive layer, "C" is a pattern and/or solid printing layer, "D" is a modified olefin resin layer, "E" is a paint layer, and "10" is the metal sheet. This embodiment differs from the embodiment shown in FIG. 1 in that the pattern and/or solid printing layer C and modified polyolefin resin layer D are exchanged for each other in the order of laminating.

Namely, in the resin-coated metal sheet as described therein, printing layer C is formed between paint layer E and modified polyolefin resin layer D. In this case, transparent modified polyolefin resin layer is used as modified polyolefin resin layer D so as to provide vivid reflectivity to a design of printing layer C formed thereunder, so that the pattern of printing layer C can be seen from the outside.

FIG. 3 illustrates another embodiment of the present invention wherein "A" is a transparent polyester resin film, "B" is an adhesive layer, "C" is a modified olefin layer, "D" is a paint layer, and "10" is the metal sheet.

This embodiment differs from that of FIG. 2 in that this embodiment does not include a printing layer C. In this case, the appearance of paint layer D can be observed from above through transparent polyester resin film A.

A resin-coated metal sheet according to the present invention can be produced as follows:

(1) A galvanized iron sheet is coated with resin paint by roll coating at least one time. The number of roll coatings depends upon the thickness of the paint layer desired.

(2) A laminate film as exemplified by that shown in FIG. 1 is produced as explained below.

First, adhesive is painted onto polyester resin film by roll coating to form an adhesive layer on the polyester resin film. After drying, a pattern is printed on the adhesive layer. Further, according to demand, a pattern is printed on the adhesive layer. Further, according to demand, solid printing is made thereon. Alternatively, pattern printing is omitted and only solid printing is made. A modified polypropylene resin layer is formed over the printing layer by extrusion coating to form a laminate film.

(3) The overlay is produced as follows.

The painted steel sheet of (1) is heated and is overlaid by the laminate film by means of a laminating roll, and the painted steel sheet overlaid by a laminated film is further heated and pressed by means of a mirror roll. Thereafter, the painted steel sheet overlaid by the laminate film is cooled. For this step, the suitable roll pressure of the laminating roll is 1 kg/cm$^2$ to 80 kg/cm$^2$, and more desirable, 5 kg/cm$^2$ to 60 kg/cm$^2$. When the roll pressure is less than 1 kg/cm$^2$, the laminate film cannot be brought into close contact with the painted steel sheet uniformly over the width of the painted steel sheet so that there are produced variations in the appearance (vivid reflectivity). On the other hand, when the roll pressure is more than 80 kg/cm$^2$, the roll is so heavily abraded that the laminating roll must be changed frequently, thereby decreasing productivity.

EXAMPLE 1

Production of Painted Steel Sheet

Polyester Copolymer paint including while pigment was painted onto 0.5 mm thick galvanized iron sheet, 10 g/m$^2$ galvanizing amount, 0.05 mg/dm$^2$ chromate film layer (as amount of chromium), and an average surface roughness Ra of 0.3 microns, with thickness 15 microns, and made thermoset to form a painted steel sheet.

Production of a Laminate Film

Polyester resin adhesive was painted onto a 25 microns thick transparent polyethylene terephthalate film which had been previously top-coated with 5 microns thick polyester resin as a film-protective layer. The adhesive layer was 1 micron thick. Then a grain pattern was printed thereon using polyester resin ink of thickness 1 micron. Thereafter, transparent modified polypropylene resin layer, consisting of a mixture of 100 parts by weight of polypropylene copolymer with 100 parts by weight of polypropylene of 20 microns thickness was formed on the printed side of the polyethylene terephthalate film by extrusion coating to form a laminate film.

Overlay

The painted steel sheet was overlaid by the laminate film in an atmosphere of 200° C., under the roll pressure of 20 kg/cm$^2$. As a result the numerical value indicating the vivid reflectivity of the resin-coated metal sheet was 0.8 and good, and workable adhesion strength thereof was excellent.

Comparative Example 1

A painted steel sheet was produced in the same manner as in Example 1, and then overlaid by the following laminate film. Namely, one micron thick polyester resin adhesive was painted onto 25 microns thick transparent polyethylene terephthalate film. Then, a grain pattern of 1 micron thickness was printed onto the adhesive layer using polyester resin ink to form a laminate film.

The painted steel sheet was overlaid by the laminate film to form a resinlcoated metal sheet in the same manner as in Example 1. As a result the workable adhesion strength of the resin-coated metal sheet was good. However, the numeral value indicating the vivid reflectivity thereof was 0.1, bad and poor.

EXAMPLE 2

A painted steel sheet produced in the same manner as in Example 1 was overlaid by the following laminate film. Polyester resin adhesive of thickness 5 microns was painted onto one side of a transparent polyethylene terephthalate film of 100 microns thickness. Then, a transparent modified propylene resin layer of 100 microns thickness was formed on the painted side of the polyethylene terephthalate by extrusion coating. Grain pattern printing and solid pattern printing were made in that order on the modified propylene resin layer, each printing layer being 5 microns thick, using polyester resin ink to form a laminate film.

The painted steel sheet prepared as in Example 1 was overlaid with the laminate film in at atmosphere of 200° C. under a roll pressure of 20 kg/cm$^2$, forming a resin-coated metal sheet having vivid reflectivity. This resin-coated metal sheet had a vivid reflectivity of 1.0 and excellent workable adhesion strength.

Comparative Example 2

A painted steel sheet was produced in the same manner and then overlaid with the following laminate film. To form the laminate film, 5 microns of polyester resin adhesive was painted onto a 100 microns thick transparent polyethylene terephthalate film. Then, a transparent polypropylene resin layer of 100 microns thickness was formed on the polyethylene terephthalate film by extrusion coating. Then grain pattern printing and solid printing were made in that order on the polypropylene resin layer, with each thickness being 5 microns, using polyester resin ink to form a laminate film.

The painted steel sheet was overlaid with the laminate film in the same manner as in Example 1 to form a resin-coated metal sheet. As a result, the numerical value of the vivid reflectivity of the resin-coated metal sheet was 0.8 and good. However, the workable adhesion strength thereof was bad and poor.

EXAMPLE 3

A painted metal sheet was produced in the same manner as in Example 1, and then overlaid with the following film. A silane coupling agent was painted in a layer of 0.5 micron thickness on one side of a 12 microns thick transparent polyethylene terephthalate film. Solid printing was made thereon of 4 microns thickness using polyester resin ink including mica pigment. A transparent modified polypropylene resin layer of 5 microns thickness was formed on the printed side of the polyethylene terephthalate film by extrusion coating to form a laminate film.

A painted steel sheet as prepared for Example 1 was overlaid with the above film in an atmosphere of 200° C. under a roll pressure of 20 kg/cm$^2$ to form a resin-coated metal sheet having vivid reflectivity. As a result, the numerical value indicating the vivid reflectivity of the resin-coated metal sheet was 0.7, the workable adhesion strength thereof was excellent.

Comparative Example 3

A painted steel sheet was produced in the same manner as in Example 1, and was overlaid with the following laminate film. A silane coupling agent was painted onto one side of a 12 microns thick transparent polyethylene terephthalate film, the silane coupling agent being painted on to have a thickness of 0.5 micron. Then, polyester resin ink including mica pigment was made thereon, with a thickness of 4 microns. A transparent propylene resin layer of 5 microns thickness was formed on the printed side of the polyethylene terephthalate film by extrusion coating to form a laminate film.

The painted steel sheet was then overlaid with the laminate film in the same manner as in Example 1 to form a resin-coated metal sheet. As a result, the numerical values indicating the vivid reflectivity of the resin-coated metal sheet was 0.7, and good. However, the workable adhesion strength was bad and poor.

EXAMPLE 4

A painted steel sheet was produced in the same manner as in Example 1, and then overlaid with the following film. Polyester resin adhesive including aluminum pigment was painted in an amount of 50 microns onto one side of a 50 microns thick transparent polyethylene terephthalate film. A transparent modified polypropylene resin of 50 microns thickness was formed thereon by extrusion coating to form a laminate film.

The painted steel sheet as prepared in Example 1 was overlaid with the laminate film in an atmosphere of 200° C., under roll pressure of kg/cm$^2$, to form a resin-coated metal sheet with vivid reflectivity. The numerical value indicating the vivid reflectivity of the resin-coated metal sheet was 0.7, and the workable adhesion strength was excellent.

Comparative Example 4

A painted steel sheet was produced as in Example 1, and was then overlaid by the following laminate film. Polyester resin adhesive including aluminum pigment was painted at a thickness of 50 microns onto one side of a transparent polyethylene terephthalate film of 50 microns thickness. A transparent polypropylene resin layer of 50 microns thickness was formed thereon by extrusion coating to form a laminate film. The painted steel sheet was overlaid with the laminate film in the same manner as in Example 1 to form a resin-coated metal sheet. As a result, the numerical value indicating the vivid reflectivity of the resin-coated metal sheet was 0.7 and good. However, the workable adhesion strength thereof was bad and poor.

Method of Evaluation

Vivid Reflectivity

The vivid reflectivity of the resin-coated metal sheet of the present invention was measured by the following method. The vivid reflectivity of a normal reflected image on the decorative surface of the resin-coated metal sheet was measured by means of a portable distinctness of the PGD-4 glossmeter type, made by Japan Color Research Institute. The higher the measured value, the higher is the vivid reflectivity.

To measure the vivid reflectivity, a resin-coated metal sheet of 10 cm×10 cm was pushed horizontally against the glossmeter, and the scale of the glossmeter was read with the naked eye as the vivid reflectivity.

Workable Adhesion Strength

Evaluation of workable adhesion strength was made by taking the following two measurements and judging the results thereof synthetically.

(1) Erichsen Test

Checkered cuts reaching the base metal are made in a resin-coated surface of resin-coated metal sheet by a utter knife, and 8 mm stretch-forming the resin-coated metal sheet was made from the backside of the resin-coated metal sheet by an Erichsen tester. Thereafter, the extent of delamination was evaluated by heating the resin-coated metal sheet continuously at 100° C. for one hour and thereafter observing the existence of delamination.

In Table 1, the mark "⊙" designates no delamination, and the mark "x" designates delamination.

(2) Cup Deep Drawing Test

Deep drawing of a resin-coated metal sheet into a cup was made by a Yamada-way deep drawing tester, with drawing ratio r=2.2. Checkered cuts reaching the base metal were made in a resin surface of the resin-coated metal sheet formed into a cylindrical part of a cup, with a space of 5 mm. Thereafter, the extent of delamination was evaluated by continuously heating the resin-coated metal sheet formed into a cup by deep drawing and thereafter observing the existence of delamination. In Table 1, the mark "⊙" designates no delamination, and the mark "x" designates delamination.

Effect of the Invention

As can readily be seen from Table 1 and Table 2, a modified polyolefin resin layer included in a laminate film has excellent adhesion strength with a printing layer, paint layer, polyester resin film and others. Even if severe work such as deep drawing is made, no delamination occurs between the layers. Therefore, the resin-coated metal sheet of the present invention has excellent workable adhesion strength. Further, since the surface roughness and convex and concave parts of the layer (resin layer) are absorbed by the modified polyolefin resin layer, the resin-coated metal sheet of the present invention has excellent vivid reflectivity for the resin-coated metal sheet.

TABLE 1

| | The composition of a laminate film | | | | | | Workable adhesion strength | |
|---|---|---|---|---|---|---|---|---|
| | Painted steel sheet | | | | Transparent | | | Cup-deep |
| | Metal sheet | Color paint layer E | Polyolefin resin layer D | Printing layer C | Adhesive layer B | polyester resin film A | Value of vivid reflectivity | Erichsen test | drawing test |
| Example 1 | Galvanized sheet iron 0.5 mm thickness | Polyester copolymer inc. white pigment 15 μm | Transparent modified poly-propylene resin 20 μm | Polyester ink grain printing 1 μm | Polyester resin 1 μm | Transparent polyethylene terephthalate film 25 μm | 0.8 | ⊙ | ⊙ |
| Comparison 1 | Galvanized sheet iron 0.5 mm thickness | Polyester copolymer inc. white pigment 15 μm | — | Polyester ink grain printing 1 μm | Polyester resin 1 μm | Transparent polyethylene terephthalate film 25 μm | 0.1 | ⊙ | ⊙ |
| Example 2 | Galvanized sheet iron 1.0 mm thickness | Polyester copolymer inc. white pigment 20 μm | Transparent modified poly-propylene resin 100 μm | Polyester ink grain + solid printing 10 μm | Polyester resin 5 μm | Transparent polyethylene terephthalate film 100 μm | 1.0 | ⊙ | ⊙ |
| Comparison 2 | Galvanized sheet iron 1.0 mm thickness | Polyester copolymer inc. white pigment 20 μm | Transparent polypropylene resin 100 μm | Polyester ink grain + solid printing 10 μm | Polyester resin 5 μm | Transparent polyethylene terephthalate film 100 μm | 0.8 | x | x |
| Example 3 | Tin-free steel 0.3 mm thickness | Polyester copolymer inc. white pigment 5 μm | Transparent modified poly-propylene resin 5 μm | Polyester ink solid printing inc. mica pigment 4 μm | Silane coupling agent 0.5 μm | Transparent polyethylene terephthalate film 12 μm | 0.7 | ⊙ | ⊙ |
| Comparison 3 | Tin-free steel 0.3 mm thickness | Polyester copolymer inc. white pigment 5 μm | Transparent polypropylene resin 5 μm | Polyester ink solid printing inc. mica pigment 4 μm | Silane coupling agent 0.5 μm | Transparent polyethylene terephthalate film 12 μm | 0.7 | x | x |

TABLE 2

| | The composition of a laminate film | | | | | | Workable adhesion strength | |
|---|---|---|---|---|---|---|---|---|
| | Painted steel sheet | | | | Transparent | | | Cup-deep |
| | Metal sheet | Color paint layer E | Polyolefin resin layer D | Printing layer C | Adhesive layer B | polyester resin film A | Value of vivid reflectivity | Erichsen test | drawing test |
| Example 4 | Stainless steel sheet 0.5 mm thickness | Epoxy resin inc. light brown 30 μm | Modified poly-propylene resin 50 μm | — | Polyester resin inc. Al pigment 50 μm | Transparent polyethylene terephthalate film 50 μm | 0.7 | ⊙ | ⊙ |
| Comparison 4 | Stainless steel sheet 0.5 mm thickness | Epoxy resin inc. light brown 30 μm | Transparent polypropylene 50 μm | — | Polyester resin inc. Al pigment 50 μm | Transparent polyethylene terephthalate film 50 μm | 0.7 | x | x |

What is claimed is:

1. A resin-coated metal sheet consisting essentially of:
   a. a metal sheet as a base sheet;
   b. modified polyolefin layer of 5 to 100 microns thickness on the metal sheet;
   c. wherein said modified polyolefin layer is a propylene-based resin produced by blending propylene copolymer having a carboxyl group within a molecule with polypropylene in the following ratio;
   100 parts by weight to 20 parts by weight propylene copolymer;
   0 parts by weight to 80 parts by weight of polypropylene;
   d. a preformed transparent thermoplastic polyester resin film of 5 to 100 microns thickness on the modified polyolefin layer;
   e. a resin coating as a protective top coat layer on said thermoplastic polyester resin film; and
   f. an adhesive layer comprising polyester resin, epoxy resin, melamine resin, or urethane resin, between said polyester layer and said modified polyolefin layer;
   g. wherein on e surface or both surfaces of the metal sheet is/are overlaid by the modified polyolefin resin layer, the adhesive layer, and the polyester resin film.

2. A resin-coated metal sheet consisting essentially of:
   a. a metal sheet as a base sheet;
   b. a modified polyolefin layer of 5 to 100 microns thickness on the metal sheet;
   c. a preformed transparent thermoplastic polyester resin film of 5 to 100 microns thickness on the modified polyolefin layer;
   d. a resin coating as a protective top coat layer on said thermoplastic polyester resin film; and
   e. an adhesive layer comprising aluminum pigment and polyester resin, epoxy resin, melamine resin, or urethane resin, between said polyester layer and said modified polyolefin layer;
   f. wherein one surface or both surfaces of the metal sheet is/are overlaid by eth modified polyolefin resin layer, the adhesive layer, and the polyester resin film.

3. A resin-coated metal sheet as a base sheet of which at least one surface thereof is overlaid in sequential order from the base sheet surface with
   a. a paint layer;
   b. modified polyolefin layer of 5 to 100 microns thickness;
   c. an adhesive layer comprising aluminum pigment and polyester resin, epoxy resin, melamine resin, or urethane resin;
   d. a transparent thermoplastic polyester resin film of 5 to 100 microns thickness; and
   e. a resin coating as a protective top layer.

* * * * *